Figure 3:
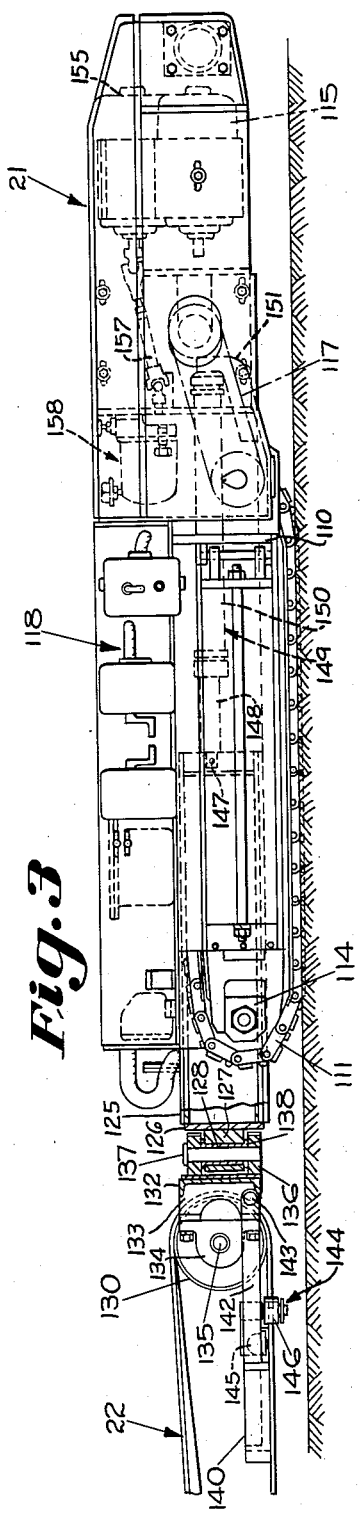

June 27, 1961 S. C. MOON 2,990,051
ENDLESS BELT CONVEYOR
Original Filed Aug. 5, 1957 3 Sheets-Sheet 1
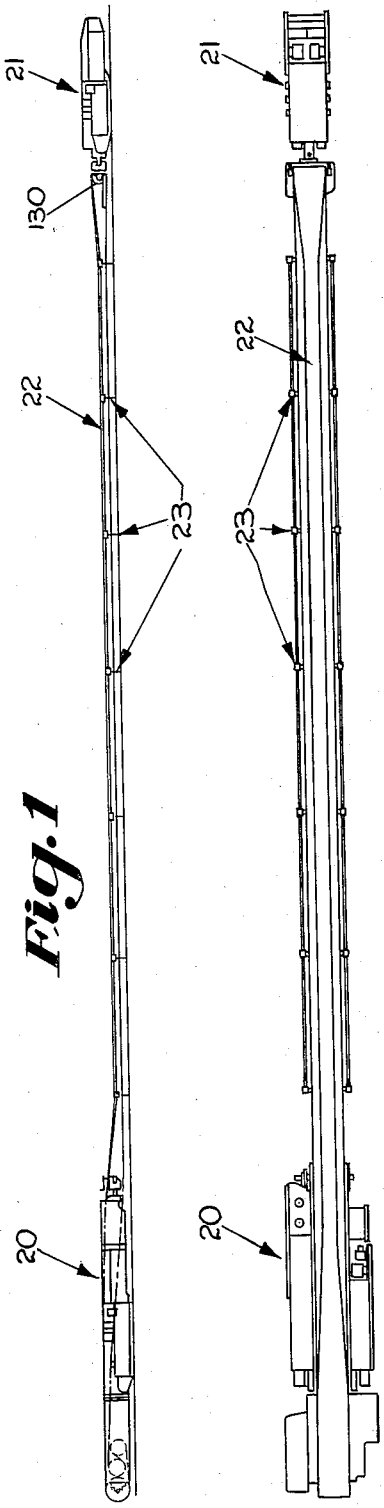
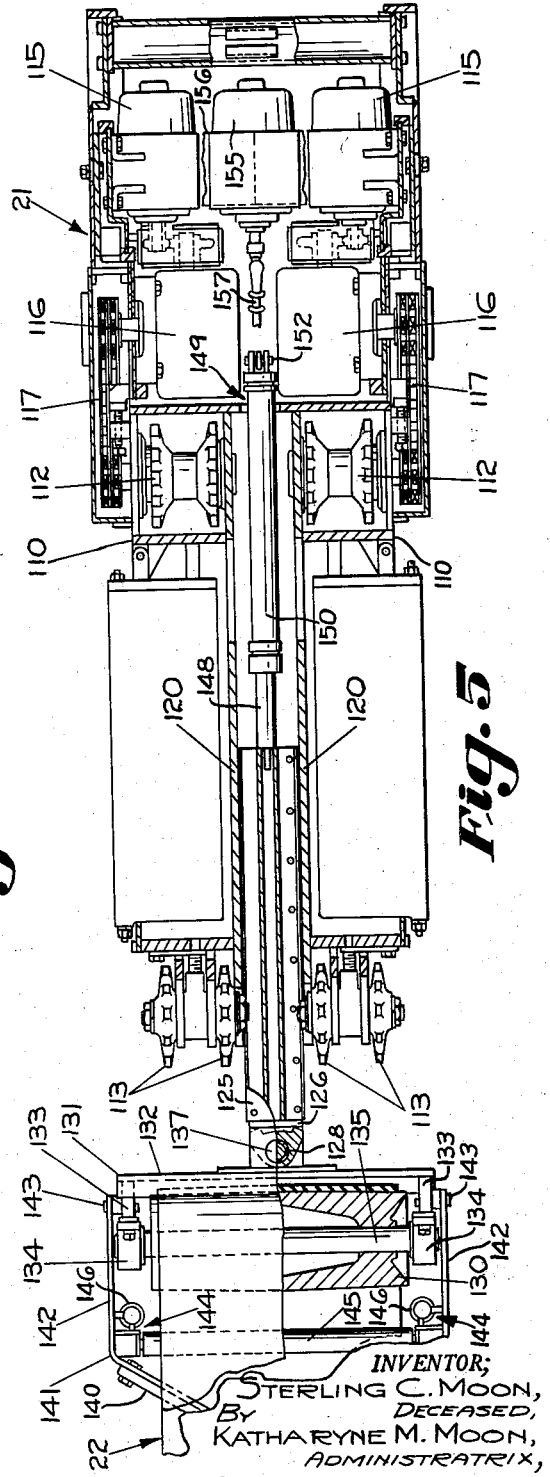
INVENTOR;
STERLING C. MOON,
DECEASED,
BY
KATHARYNE M. MOON,
ADMINISTRATRIX,
BY David Young ATT'Y.

June 27, 1961

S. C. MOON 2,990,051

ENDLESS BELT CONVEYOR

Original Filed Aug. 5, 1957

3 Sheets-Sheet 2

INVENTOR;
STERLING C. MOON,
DECEASED,
BY KATHARYNE M. MOON,
ADMINISTRATRIX,
By David Young
ATT'Y.

June 27, 1961　　　　　S. C. MOON　　　　　2,990,051
ENDLESS BELT CONVEYOR
Original Filed Aug. 5, 1957　　　　　　　　　　　3 Sheets-Sheet 3
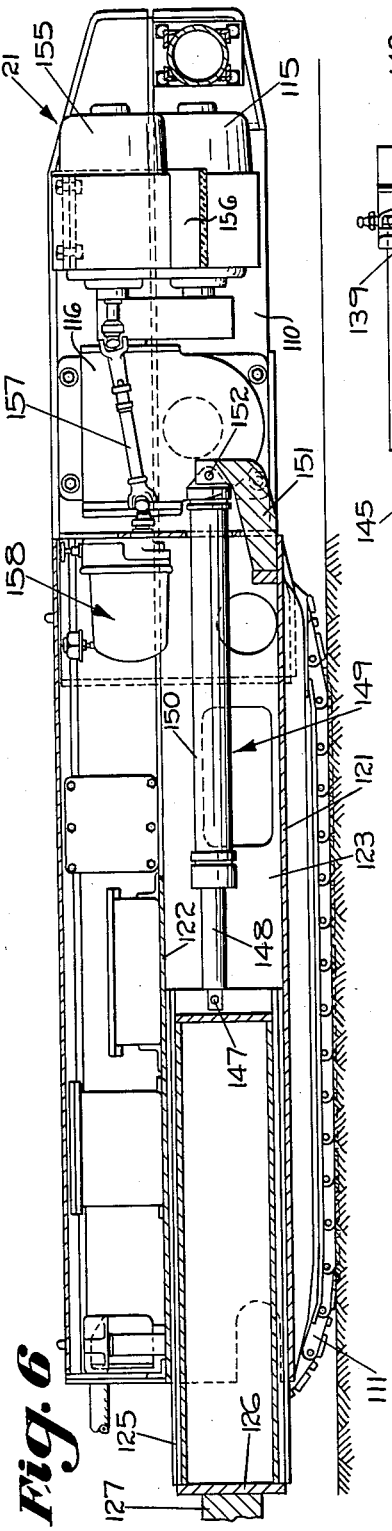
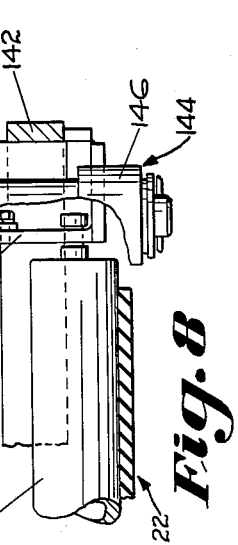
INVENTOR;
STERLING C. MOON,
DECEASED,
BY KATHARYNE M. MOON,
ADMINISTRATRIX,
By David Young
ATTY.

United States Patent Office 2,990,051
Patented June 27, 1961

2,990,051
ENDLESS BELT CONVEYOR
Sterling C. Moon, deceased, late of Dublin, Ohio, by Katharyne M. Moon, administratrix, Dublin, Ohio, assignor to The Jeffrey Manufacturing Company, a corporation of Ohio
Original application Aug. 5, 1957, Ser. No. 676,266. Divided and this application May 6, 1959, Ser. No. 811,419
4 Claims. (Cl. 198—139)

This invention relates to endless belt conveyors, and more particularly to a conveyor of the type that is particularly adapted for use in a mine as a room conveyor, the conveyor being extensible so that it may be extended further into the mine as the mining operation progresses, whereby the conveyor, in effect, follows the mining machines which remove the material from the mine. The conveyor of the instant invention comprises a head section which includes the various mechanisms for driving the endless conveyor belt, and this head section is fixed at a point in the mine at which the material can be conveniently discharged from the conveyor for removal from the mine. At its opposite end the conveyor of this invention includes a tail section which is a mobile unit that can be trammed further into the mine as the mining operation progresses, and each time that the tail section is propelled deeper into the mine an additional length of conveyor belt is added to the endless conveyor belt to increase the length thereof. The mined material is delivered to the conveyor at any point along its length, although this will usually occur near the tail section, the mined material being discharged onto the conveyor by a shorter auxiliary conveyor spanning the distance between the mining machine and the room conveyor, or the material may be discharged directly onto the room conveyor by a continuous mining machine.

It is an object of the instant invention to provide an endless belt conveyor, in which the tail end thereof includes a mobile unit with means for guiding and supporting the endless belt at the tail end of the conveyor, the mobile tail unit being formed compactly and with a relatively narrow width to facilitate maneuvering the mobile tail unit in a mine.

It is also an object of the instant invention to provide an endless belt conveyor in which the tail section includes a tail pulley for supporting the belt at the tail end of the conveyor and tension means connected to the tail pulley to exert a pull on the belt.

It is still another object of the instant invention to provide an endless belt conveyor having an end pulley that is pivotally mounted for swinging movement in a direction laterally of the run of the endless belt, and in which the assembly of the end pulley includes training means for maintaining the endless belt in proper alignment with the end pulley.

This application is a division of applicant's copending application Serial No. 676,266, filed August 5, 1957, for Endless Belt Conveyor.

Other objects of the invention will appear hereinafter, the novel features and combinations being set forth in the appended claims.

Figure 4:
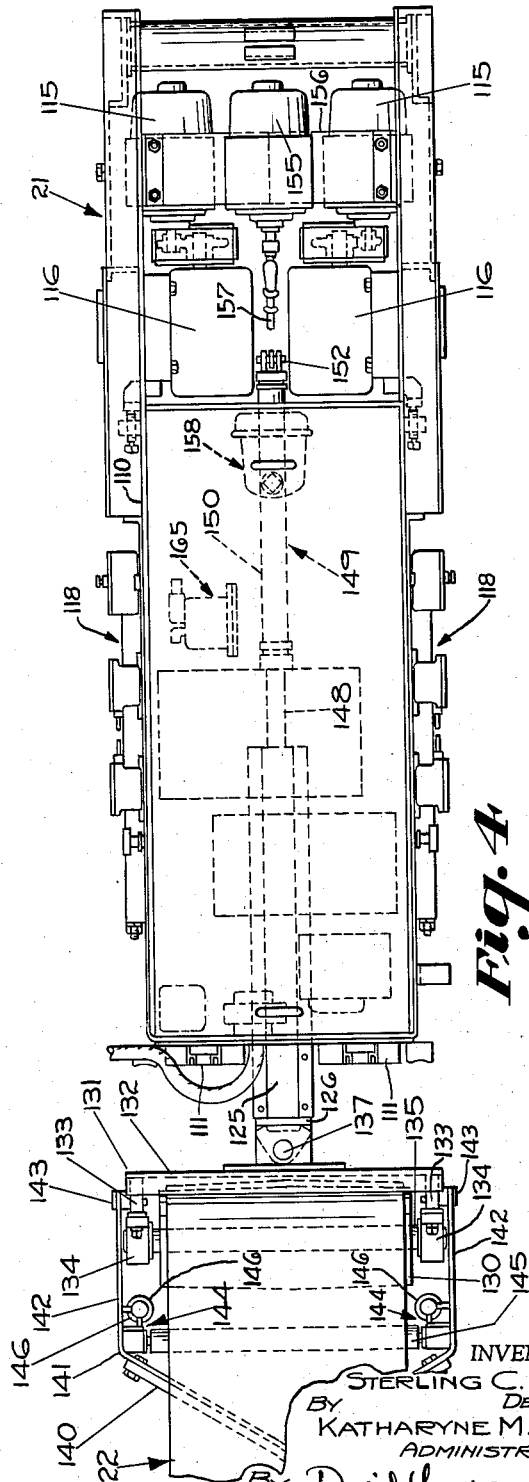

In the accompanying drawings:
FIG. 1 is an elevational view of a conveyor embodying the instant invention;
FIG. 2 is a plan view of a conveyor embodying this invention;
FIG. 3 is a side elevational view of the conveyor tail section;
FIG. 4 is a top plan view of the tail section;
FIG. 5 is a view of the tail section similar to FIG. 4 with certain parts broken away;
FIG. 6 is an elevational view in section of the tail section;
FIG. 7 shows the arrangement of the motors on the tail section;
FIG. 8 is a detail view of the training idler; and
FIG. 9 shows the hydraulic circuit in the conveyor tail section.

Referring to FIGS. 1 and 2 of the drawings, the extensible endless belt conveyor of this invention comprises a conveyor head section 20 and a conveyor tail section 21. An endless conveyor belt 22 extends between the head section 20 and the tail section 21. A plurality of stands 23 are disposed along the length of the conveyor between the head section 20 and the tail section 21, and these support the upper and lower runs of the conveyor belt 22.

The conveyor head section 20 includes means for driving the conveyor belt 22, as well as propelling means for the purpose of moving the head section 20 to the desired location in the mine. Once the head section 20 is located in the mine it will remain fixed at that position until such time as the entire conveyor is relocated. The tail section 21 includes an idler tail pulley 130 about which the endless belt 22 is trained. The tail section 21 also includes propelling means so that the tail section 21 may be moved deeper into the mine as the mining operation progresses. Each time that the tail section 21 is moved further away from the head section 20 an additional length of conveyor belt is added to the endless conveyor belt 22, thereby increasing the length of the conveyor. At such time as the length of the conveyor is increased, a sufficient number of additional stands 23 is added to the conveyor to provide adequate support for the endless belt 22 between the head section 20 and the tail section 21.

The endless belt conveyor of this invention is adated to be used as a room conveyor in a mine, in which the conveyor extends a substantial distance through the mine, with the mined material being delivered to the room conveyor at various positions along the length thereof, the room conveyor operating to carry the mined material to the head section 20 from which the mined material is delivered to a suitable conveyance which takes the mined material out of the mine.

The conveyor tail section 21 comprises a main frame 110, at each side of which there is provided an endless crawler traction tread 111 trained about a drive sprocket wheel 112 and idler sprocket wheels 113. The idler sprocket wheels 113 are rotatably mounted on a slide 114, whereby it is possible to adjust the tension in the traction treads 111. The endless crawler traction treads 111 on each side of the tail section 21 are independently operable so that the tail section 21 may be maneuvered. At the rear end of the main frame 110 there is provided a pair of motors 115, located one at either side of the main frame 110. Each of the motors 115 has its armature shaft connected to a gear box 116, the drive of which is connected to the drive sprocket 112 by chain and sprocket drive mechanism 117. Suitable control devices for operating the crawler traction treads 111 are disposed at the side of the tail section 21 at an operator's station 118.

It is seen in FIGS. 4 and 5 that the endless crawler traction treads 111 are disposed close to each other on the main frame 110 of the tail section 21, whereby the tail section 21 is of relatively narrow width. The tail section 21 is constructed in this manner in order to facilitate the entry thereof into the mine, and to permit it to maneuver freely therein. Due to the space limitations in the mine, the tail section 21 is also of relatively low height so that it may freely travel through the mine.

The main frame 110 includes upright, longitudinally extending side plates 120, spaced from each other and disposed at the center of the tail section 21, and located between the endless crawler traction treads 111. Adjacent the bottom of the main frame 110 there is provided a bottom plate 121, and spaced above the bottom plate 121 is a top plate 122, the plates 121, 122 spanning the distance between the bottoms and tops, respectively, of the side plates 120. The side plates 120 and the bottom and top plates 121, 122 together form a track 123 extending longitudinally of the tail section 21. A sliding support member 125 is received within the track 123 and is adapted to reciprocate therein. The forward end of the support member 125 is formed with an end plate 126 to which there is secured a tongue 127 having an upright bore 128. The supporting member 125 is adapted to carry the tail pulley 130 of the conveyor, the conveyor belt 22 being trained around the tail pulley 130 at the tail end of the conveyor.

The tail pulley 130 is carried in a yoke 131 comprising a back member 132, having at each of its ends a forwardly extending arm 133, to each of which there is secured a pillow block 134. The pillow blocks 134 rotatably support the ends of a shaft 135, the tail pulley 130 being secured to the shaft 135 for rotation therewith. A clevis 136 is secured to the rear of the back member 132 and is mated with the tongue 127, with a pin 137 extending through the clevis 136 and the tongue 127 to thereby secure the yoke 131 and the tail pulley 130 to the supporting member 125. The assembly of the tongue 127 and the clevis 136 includes sleeve bearings 138 disposed in the bore 128, to permit the yoke 131 to swing freely relatively to the end of the supporting member 125. A plow type belt cleaner 140 is secured to the yoke 131 and is disposed in front of the tail pulley 130. The belt cleaner 140 is secured to the yoke 131 by a strap member 141 having parallel arms 142 which extend substantially parallel to the direction of travel of the conveyor belt 22, the ends of the arms 142 being pivotally secured to the arms 133 on the yoke 131 by pins 143. Thus the plow type belt cleaner 140 rests on the return run of the conveyor belt 22 by its own weight and will operate to scrape any loose material therefrom and guide such material to the sides of the conveyor belt 22 where it is discharged over the edges thereof.

The assembly of the tail pulley 130 also includes a training idler 144 for maintaining the conveyor belt 22 in proper alignment with the tail pulley 130. The training idler 144 comprises an idler roll 145 extending transversely of the conveyor belt 22 and mounted on brackets 139 (FIG. 8) secured to the arms 142 of the strap member 141. The idler roll 145 is freely rotatable. At either side of the conveyor belt 22 and adjacent each end of the idler roll 145 there is provided an idler roll 146 secured to the brackets 139 and the arms 142 of the strap member 141, on an upright axis, with the idler rolls 146 being so located that the peripheries thereof are in line with the plane of the return run of the conveyor belt 22. Thus, should the conveyor belt 22 shift laterally and tend to go off the tail pulley 130, the edge of the return run of the conveyor belt 22 will engage the periphery of one or the other of the idler rolls 146, thereby tending to swing the yoke 131 about the axis of the pivot pin 137, which action will operate to restore the conveyor belt 22 to a centrally located position on the periphery of the tail pulley 130. This centering action may occur successively, and the total effect thereof will be to maintain the conveyor belt 22 centered in a lateral direction on the tail pulley 130 and thereby reduce the wear of the belt.

The sliding support member 125, in addition to supporting the weight of the yoke 131 and the tail pulley 130, exerts a pull on the yoke 131 and on the tail pulley 130 for the purpose of maintaining a predetermined amount of tension in the conveyor belt 22 so that the conveyor belt 22 will be properly driven by the belt drive pulleys 42, 43. For this purpose there is secured to the rear end of the sliding support member 125 by means of a pin 147 (FIG. 6) the piston 148 of a hydraulic cylinder and piston mechanism 149. The rear end of the cylinder 150 is secured to a post 151 by a pin 152. The post 151 is secured to the bottom plate 121 of the track 123, as by welding or the like, and forms a supporting member for the rear end of the cylinder and piston mechanism 149 and resists the force thereof. Hydraulic fluid under pressure is supplied to the cylinder and piston mechanism 149 for the purpose of operating the piston in such direction as to withdraw the piston rod 148 into the cylinder 150, whereby there will be a pull exerted on the sliding support member 125, and this pull will be transmitted to the tail pulley 130 for maintaining the conveyor belt 22 under tension.

The hydraulic circuit for operating the cylinder and piston mechanism 149 is illustrated in FIG. 9. A motor 155 is mounted on the main frame 110 at the rear of the tail section 21 between the motors 115, there being provided a pair of angularly disposed plates 156, which extend inwardly towards each other from the sides of the main frame 110 and form a cradle for the placement of the motor 155. The armature shaft of the motor 155 has connected thereto a drive shaft 157 which, in turn, is connected to a hydraulic pump unit 158, which is a combination hydraulic pump and fluid reservoir. The hydraulic pump 158 delivers fluid to a hydraulic line 159 through a check valve 160. The fluid from the line 159 flows to an accumulator 161 through the hydraulic line 162. The accumulator 161 is placed in the system to provide a steady supply of fluid to the system under constant pressure. The hydraulic line 163 delivers fluid to a hydraulic line 164 which, in turn, delivers the fluid to a hydraulic actuator 165. The hydraulic actuator 165 controls the operation of the motor 155 according to the pressure of the hydraulic fluid in the system. A hydraulic line 166 delivers hydraulic fluid to a pressure reducing valve 167. The output from the pressure reducing valve 167 is delivered to the cylinder and piston mechanism 149 through a hydraulic line 168, and operates the cylinder and piston mechanism 149 to exert a constant pull on the sliding support member 125 for the purpose of maintaining the conveyor belt 22 under tension. The hydraulic line 169 receives hydraulic fluid from hydraulic lines 170, 171, 172, and 173, each of which lines are drain lines from the various devices in the hydraulic system, the hydraulic line 169 conducting the fluid back to the hydraulic pump unit 158 to be recirculated.

The motor 155 drives the hydraulic pump unit 158 which supplies fluid under pressure through hydraulic lines 159, 162 to the accumulator 161. The hydraulic pump unit 158 builds up a supply of hydraulic fluid under constant pressure in the accumulator 161. The hydraulic fluid is supplied under constant pressure by the accumulator 161 through the hydraulic lines 162, 163, 164 to the hydraulic actuator 165. When the hydraulic fluid in the accumulator 161 and in the hydraulic lines 162, 163, 164 has reached a predetermined maximum value, the transmission of this fluid pressure to the hydraulic actuator 165, as aforementioned, will result in operation of the hydraulic actuator to stop the motor 155, the system thereafter operating by supply of hydraulic fluid under pressure from the accumulator 161. This fluid under pressure is supplied through the hydraulic line 166 to the pressure reducing valve 167 from which a hydraulic line 168 leads to the cylinder and piston mechanism 149. The pressure reducing valve 167 reduces the pressure of the fluid fed through the line 168 to the cylinder and piston mechanism 149. After the supply of hydraulic fluid, which was initially built up in the accumulator 161, is exhausted, the fluid pressure transmitted to the hydraulic actuator 165 will drop until it reaches a certain minimum value which will then cause operation of the hydraulic actuator 165 to start up the motor 155, thereby repeating the above described operation to again build up a supply of hydraulic fluid under pressure in the accumulator 161, until the hydraulic fluid in the system reaches the predetermined maximum value, at which point the hydraulic actuator 165 is operated to stop the motor 155.

By the instant invention there is provided a novel tail section for an endless belt conveyor that is compactly constructed to particularly adapt the tail section for use in mines where the available space for such equipment is limited. In accordance with this invention the tail section is a mobile unit that may be advanced further into the mine as the mining operation progresses, the conveyor being extended to provide a greater length thereof into the mine. The tail section comprises a tail pulley for guiding the conveyor belt at the end of its run, and is mounted on crawler traction treads by which the tail section may be propelled to its desired location, the crawler traction treads being disposed in alignment with the tail pulley to provide a minimum width for the tail section. Between the crawler traction treads, in the main frame of the tail section there is a track for a longitudinally extending support that is slidably mounted in the track and extends beyond the end of the tail section. The projecting end of the slidable support carries the tail pulley for the conveyor belt on an upright pivot for adjustment of the pulley laterally to equally support the conveyor belt. The tail section also includes means secured to the opposite end of the slidable support for applying a constant tension to the slidable support and thereby maintaining the tension in the conveyor belt guided by the tail pulley.

Obviously those skilled in the art may make various changes in the details and arrangements of parts without departing from the spirit and scope of the invention as defined by the claims hereto appended, and applicant therefore wishes not to be restricted to the precise construction herein disclosed.

Having thus described and shown an embodiment of the invention, what is desired to secure by Letters Patent of the United States is:

1. In a conveyor comprising an endless belt conveying element, an end pulley at one end of the conveyor for guiding the belt at one end of its run, a mobile unit carrying the end pulley, said mobile unit comprising a frame, traction means disposed at each side of the frame for supporting and propelling said mobile unit, said frame including frame members forming a longitudinally extending track centrally disposed in the frame between the traction means, said traction means at each side of the frame being disposed adjacent said frame members, a sliding support member slidably carried by the track, said support member having an end projecting beyond the traction means, means securing the pulley to the projecting end of the support member, constant pressure means disposed between the support member and the frame to apply a constant tension to the belt, said traction means being disposed in longitudinal alignment with the end pulley.

2. In a conveyor comprising an endless belt conveyor element, an end pulley at one end of the conveyor for guiding the belt at one end of its run, a mobile unit carrying the end pulley, said mobile unit comprising a frame, said frame including frame members forming a longitudinally extending track, a sliding support member slidably carried by the track, said support member having an end projecting beyond the frame, means securing the pulley to the projecting end of the support member, and means disposed in the track between the support member and the frame to apply tension to the belt conveying element.

3. In a conveyor comprising a frame, an endless belt conveying element, an end pulley at one end of the conveyor for guiding the belt at one end of its run, a sliding support member for carrying the end pulley, pivot means pivotally connecting the end pulley to an end of the support member, said frame including frame members forming a longitudinally extending track for said sliding support member, and constant pressure means connected to the support member and to the frame for applying a constant tension to the endless belt conveying element, said constant pressure means being disposed within the track.

4. In a conveyor comprising an endless belt conveying element, an end pulley at one end of the conveyor for guiding the belt at one end of its run, a mobile unit carrying the end pulley, said mobile unit comprising a frame, endless traction means disposed at each side of the frame for supporting and propelling said mobile unit, a track in the frame centrally disposed between the endless traction means and extending longitudinally of the frame, a sliding support member slidably carried in the track, said support member having an end projecting beyond the traction means, a yoke pivotally secured to the projecting end of the support member, said pulley being rotatably carried by the yoke, hydraulic cylinder and piston means connected between the support member and the frame, means for applying a constant pressure to the hydraulic cylinder and piston means for operating the support member in a direction to apply a constant tension to the belt, said endless traction means being disposed in alignment with the end pulley.

References Cited in the file of this patent

UNITED STATES PATENTS

| | | |
|---|---|---|
| 2,725,757 | Murphy | Dec. 6, 1955 |
| 2,798,714 | Russell | July 9, 1957 |
| 2,831,568 | Ball | Apr. 22, 1958 |
| 2,837,204 | Lo Presti | June 3, 1958 |